(12) United States Patent  
Weston et al.

(10) Patent No.: US 12,482,454 B2
(45) Date of Patent: Nov. 25, 2025

(54) METHODS AND SYSTEMS FOR TRAINING AND DEPLOYING NATURAL LANGUAGE UNDERSTANDING MODELS

(71) Applicant: Fifth Third Bank, Cincinnati, OH (US)

(72) Inventors: Arthur Eladio Weston, Union, KY (US); Samuel Davis Edison, Cincinnati, OH (US); Christopher Ryan Germain, Cincinnati, OH (US); Sarah Elizabeth Rossi, Cincinnati, OH (US)

(73) Assignee: Fifth Third Bank, Cincinnati, OH (US)

( * ) Notice: Subject to any disclaimer, the term of this patent is extended or adjusted under 35 U.S.C. 154(b) by 251 days.

(21) Appl. No.: 18/447,421

(22) Filed: Aug. 10, 2023

(65) Prior Publication Data

US 2025/0054493 A1  Feb. 13, 2025

(51) Int. Cl.
| | |
|---|---|
| *G10L 15/18* | (2013.01) |
| *G06F 40/295* | (2020.01) |
| *G06F 40/30* | (2020.01) |
| *G10L 15/06* | (2013.01) |
| *G10L 15/22* | (2006.01) |
| *G06F 40/35* | (2020.01) |
| *G10L 15/183* | (2013.01) |

(52) U.S. Cl.
CPC .......... *G10L 15/063* (2013.01); *G06F 40/295* (2020.01); *G06F 40/30* (2020.01); *G10L 15/18* (2013.01); *G10L 15/1815* (2013.01); *G10L 15/22* (2013.01); *G06F 40/35* (2020.01); *G10L 2015/0631* (2013.01); *G10L 2015/0633* (2013.01); *G10L 15/1822* (2013.01); *G10L 15/183* (2013.01)

(58) Field of Classification Search
None
See application file for complete search history.

(56) References Cited

U.S. PATENT DOCUMENTS

| | | | | |
|---|---|---|---|---|
| 7,739,102 B2 * | 6/2010 | Bender | ................... | G06F 40/58 |
| | | | | 706/14 |
| 10,943,583 B1 * | 3/2021 | Gandhe | ................. | G10L 15/183 |
| 11,238,232 B2 * | 2/2022 | Sapugay | ................ | G06N 20/00 |
| 11,487,948 B2 * | 11/2022 | Kaur | ...................... | G06N 3/096 |
| 12,099,816 B2 * | 9/2024 | Jalaluddin | ............. | G06F 40/295 |
| 12,230,248 B2 * | 2/2025 | Chandra | ................ | G06N 3/088 |
| 2018/0301150 A1 * | 10/2018 | Woo | ..................... | G06F 3/04842 |
| 2019/0057076 A1 * | 2/2019 | Boguraev | ............. | G06F 40/211 |
| 2019/0294676 A1 * | 9/2019 | Sapugay | ................ | G10L 15/19 |

(Continued)

*Primary Examiner* — Richard Z Zhu
(74) *Attorney, Agent, or Firm* — Frost Brown Todd LLP

(57) ABSTRACT

The present disclosure describes an electronic device. The electronic device includes a memory and a processor. The processor is configured to provide an utterance to an NLU model, which selects an intent from the list of intents based on the utterance. The processor is also configured to cause a response to the utterance to be provided to a user based on the selected intent. The NLU may be trained by obtaining a dataset comprising one or more words, generating a list of intents based at least in part on the dataset, grouping the list of intents into one or more domains, generating a list of training utterances for each intent in the list of intents, and modifying one or more parameters of the NLU model based on the list of intents, the list of training utterances, and/or the one or more domains.

20 Claims, 8 Drawing Sheets

(56) References Cited

U.S. PATENT DOCUMENTS

| | | | |
|---|---|---|---|
| 2020/0257761 A1* | 8/2020 | Bull | G06F 40/289 |
| 2021/0103634 A1* | 4/2021 | Gkikas | G06F 40/211 |
| 2021/0350084 A1* | 11/2021 | Zhang | G06F 40/35 |
| 2022/0043848 A1* | 2/2022 | Hsiao | G06F 16/355 |
| 2022/0208177 A1* | 6/2022 | Chandra | G06N 3/088 |
| 2022/0223146 A1* | 7/2022 | Aili | G06F 40/30 |
| 2022/0230000 A1* | 7/2022 | Jalaluddin | G06F 40/295 |
| 2023/0141398 A1* | 5/2023 | Bahdanau | G06F 40/30 |
| | | | 704/9 |
| 2024/0304179 A1* | 9/2024 | Kim | G10L 25/30 |
| 2024/0330597 A1* | 10/2024 | Temraz | G06F 40/35 |
| 2025/0190794 A1* | 6/2025 | Bahdanau | G06N 3/08 |

\* cited by examiner

METHODS AND SYSTEMS FOR TRAINING AND DEPLOYING NATURAL LANGUAGE UNDERSTANDING MODELS

FIELD

This disclosure is generally related to machine learning and, more particularly, to natural language understanding.

BACKGROUND

Natural Language Understanding (NLU) is a subfield of Artificial Intelligence (AI) that focuses on enabling machines to comprehend, interpret, and respond to human language in a meaningful way. NLU may involve the application of computational linguistics and machine learning algorithms to analyze the structure, meaning, and intent of human language inputs. Human language inputs may include utterances, which may be a message (e.g., text and/or speech) that a user provides to be understood by NLU.

Specifically, processing utterances may refer to the conversion of continuous speech (e.g., text data and/or audio data) input into discrete linguistic units for analysis. In the context of NLU, utterances may be analyzed to determine the intent of the speaker, which is the goal or purpose that the speaker aims to achieve through their speech. Intent determination typically employs techniques such as named entity recognition (NER), sentiment analysis, text classification, and the like.

NLU may also involve the use of text embeddings, a technique used to transform textual information into numerical representations that can be processed by machine learning algorithms. Text embeddings capture the semantic relationships between words, phrases, and/or sentences, by representing them as vectors in a multi-dimensional space. Each dimension in such space encodes a particular aspect of the linguistic context, thereby preserving the semantics, syntax, and/or co-occurrence information of the language data. These embeddings may provide an effective way of dealing with the inherent ambiguity and variability of natural language, allowing for a more nuanced understanding of the input text. By using embeddings, NLU systems can enhance their ability to identify intents, process utterances, and ultimately better understand and respond to human language inputs.

However, many existing text embedding models (e.g., fastText) do a poor job of incorporating the context of words when transforming natural language into vectors for an NLU model to ingest as input. Different scenarios, such as banking, may involve non-specific (e.g., ambiguous) language for describing items and actions that require context to understand. For example, the phrase "check balance" may refer to the action of checking a balance on an account or the balance of a paper check to be deposited. In such scenarios, more context may be needed by the NLU model to determine the meaning of the phrase at issue, which is not provided by existing text embedding models.

SUMMARY

Aspects of the present disclosure meet the foregoing needs by presenting approaches to structuring training data and domains for providing additional context to NLU models without having to modify the embedding models that are used. A domain may be a collection of intents into which an utterance may be classified (e.g., via an NLU model). Aspects of the present disclosure also simplify the generation of NLU models by automating the process for training NLU models.

Accordingly, one aspect of the present disclosure includes a method, electronic device, and non-transitory computer-readable medium for utilizing an NLU. In some implementations, a method may include providing an utterance to an NLU model, selecting, by the NLU model, an intent from the list of intents based on the utterance, and providing a response to the utterance based on the selected intent. The NLU may be trained based on a list of training utterances and a list of intents grouped by one or more domains.

Another aspect of the present disclosure includes a method, electronic device, and non-transitory computer-readable medium for training an NLU. In some implementations, a method may also include obtaining a dataset comprising one or more words, generating a list of intents based at least in part on the dataset, grouping the list of intents into one or more domains, generating a list of training utterances for each intent in the list of intents, and modifying one or more parameters of the NLU model based on at least one of the list of intents, the list of training utterances, or the one or more domains.

There have thus been broadly outlined certain inventive embodiments of the present disclosure in order that the detailed description thereof herein may be better understood and in order that the present contribution to the art may be better appreciated. There are additional embodiments that will be described below, which will form the subject matter of the claims.

BRIEF DESCRIPTION OF THE DRAWINGS

In order to facilitate a more complete understanding of the inventive aspects in the present disclosure, reference is now made to the accompanying drawings, in which like elements are referenced with like numerals. These drawings should not be construed as limiting the invention and are intended only to be illustrative.

DETAILED DESCRIPTION

Figure 1:
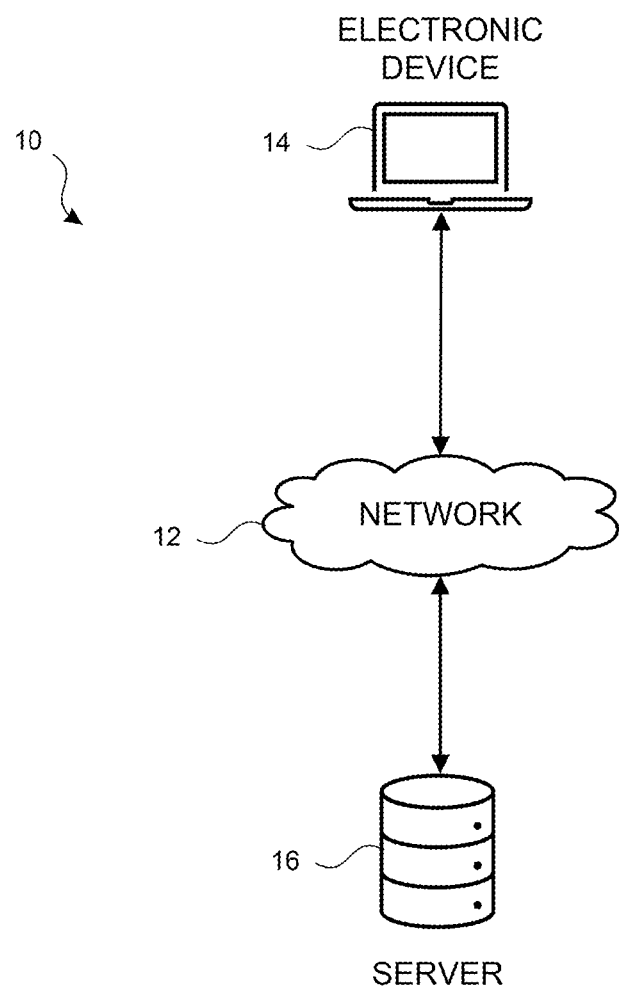
FIG. 1 illustrates a system diagram of an exemplary communication system in accordance with one or more implementations of the present disclosure.

In this respect before explaining at least one embodiment of the present disclosure in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein as well as the abstract, are for the purpose of description and should not be regarded as limiting.

Phrases such as an aspect, the aspect, another aspect, some aspects, one or more aspects, an implementation, the implementation, another implementation, one or more implementations, one or more implementations, an embodiment, the embodiment, another embodiment, one or more implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase (s) may provide one or more examples. A phrase such as an aspect or some aspects may refer to one or more aspects and vice versa, and this applies similarly to other foregoing phrases. Similarly, various. Requirements are described that may be requirements for some embodiments but not for other embodiments.

Aspects of the present disclosure improve the accuracy and flexibility of NLU models (e.g., in fields such as banking) where the context of words may play a role in disambiguating their meaning. Aspects of the present disclosure also improve the NLU process through the use of more accurate and flexible NLU models. For example, conversations between users and chatbots may be improved via more accurate classification of user utterances into relevant intents. Aspects of the present disclosure may be represented in concepts including threading, annealing, nesting, and classifying (which may collectively be referred to herein as TANC). Threading may include presenting word combinations that correspond to an action or topic in each utterance in the training data for each intent. Annealing may include a process of iteratively shaping, building, testing, and/or tuning the NLU model. Nesting may include structuring the NLU model such that an utterance is categorized into a higher-level domain and then to a more specific intent at a lower level. Classifying may include scoring each utterance by the trained NLU model for classification into an intent that is most similar to its meaning.

General Architecture

FIG. 1 illustrates a system diagram of an exemplary communication system 10 in accordance with one or more implementations of the present disclosure. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The communication system 10 may include an electronic device 14 and one or more network devices (e.g., a server 16). The network 12 may communicatively (directly or indirectly) couple the electronic device 14 and the server 16.

In one or more implementations, the network 12 may be an interconnected network of devices that may include, or may be communicatively coupled to, the Internet. For explanatory purposes, the communication system 10 is illustrated in FIG. 1 as including the electronic device 14 and the server 16; however, the communication system 10 may include any number of electronic devices and/or any number of servers communicatively coupled to each other directly and/or via the network 12.

The electronic device 14 may be a desktop computer, a portable computing device such as a laptop computer, a smartphone, a tablet device, or any other appropriate device that includes, for example, one or more wireless interfaces, such as wireless local area network (WLAN) radios, cellular radios, Bluetooth radios, Zigbee radios, near field communication (NFC) radios, and/or other wireless radios. The electronic device 14 may be, and/or may include all or part of, a node 30 discussed below with respect to FIG. 2.

In one or more implementations, one or more network devices (e.g., the server 16) may facilitate natural language understanding with nodes (e.g., the electronic device 14). The server 16 may include hardware and/or software configured to perform aspects of natural language understanding. For example, the server 16 may be configured to handle tasks such as generating, storing, and processing training data, generating and storing NLU models, and/or retrieving and processing utterances and/or intents. In some implementations, the server 16 may train the NLU model and provide the trained NLU model to the electronic device 14 to utilize for determining intents. In some implementations, the server 16 may receive one or more intents from the electronic device 14 to facilitate one or more user interactions associated with the intents.

Figure 2:
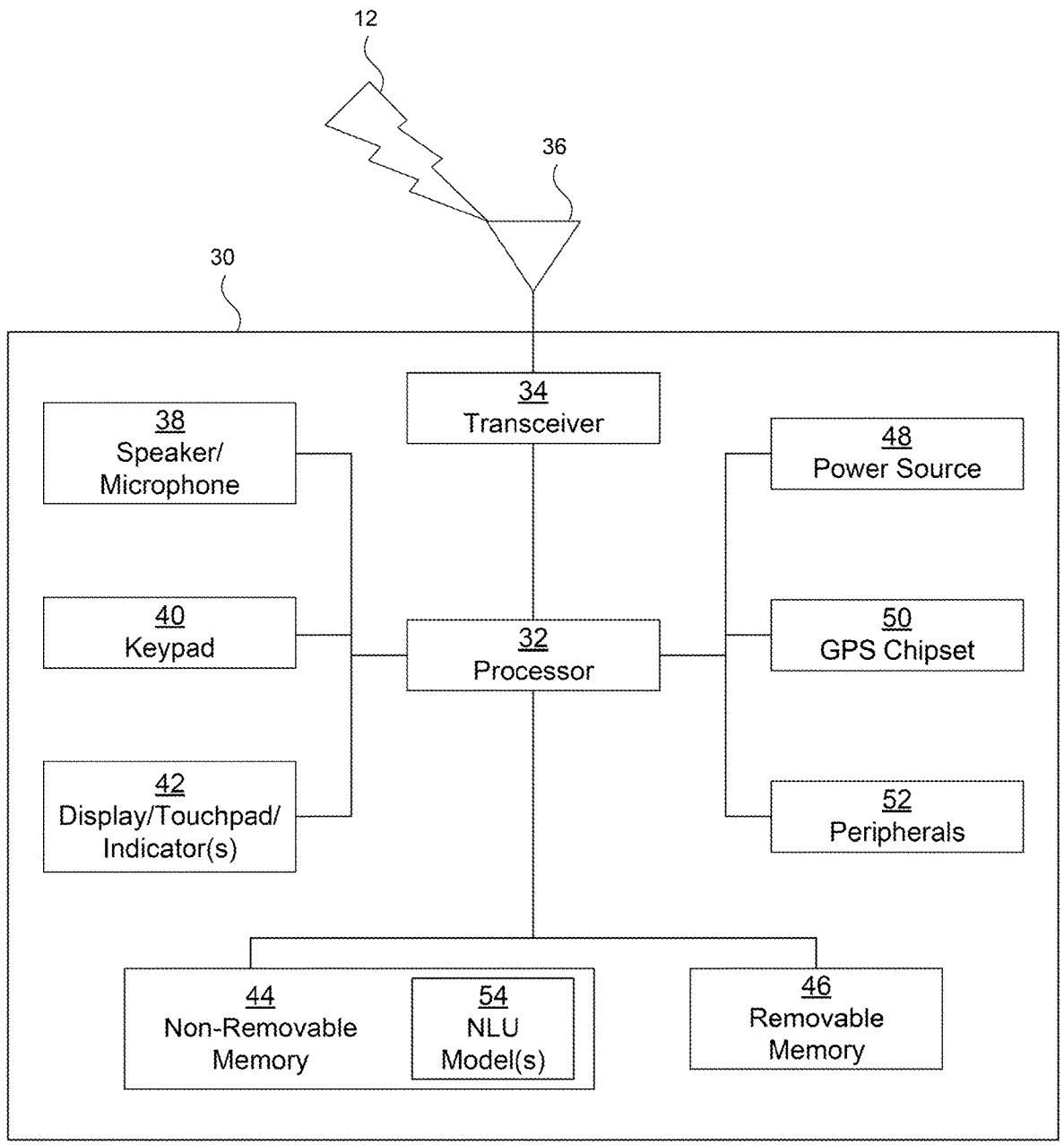
FIG. 2 illustrates a block diagram of an exemplary communication network node in accordance with one or more implementations of the present disclosure.

FIG. 2 illustrates a system diagram of an exemplary hardware/software architecture of a node 30 of a network 12 in accordance with one or more implementations of the present disclosure. The node 30 (e.g., the electronic device 14 and/or the server 16) may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. The node 30 may include any combination or sub-combination of the foregoing elements while remaining consistent with one or more embodiments.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node 30 in order to perform the various required functions of the node 30. For example, the processor 32 may perform signal coding, data processing, power control, input/output processing, and/or any other functionality that enables the node 30 to operate in a wireless or wired environment. The processor 32 may run application layer programs (e.g., browsers) and/or radio-access-layer (RAN) programs and/or other communications programs. The processor 32 may also perform security operations, such as authentication, security key agreement, and/or cryptographic operations.

The processor 32 may be coupled to its communication circuitry (e.g., transceiver 34 and transmit/receive element 36). The processor 32, through the execution of computer-executable instructions, may control the communication circuitry to cause the node 30 to communicate with other nodes via the network to which it is connected. While FIG. 2 depicts the processor 32 and the transceiver 34 as separate components, the processor 32 and the transceiver 34 may be integrated together in an electronic package or chip.

The transmit/receive element 36 may be configured to transmit signals to, or receive signals from, other nodes including servers, gateways, wireless devices, and the like. For example, in an embodiment, the transmit/receive element 36 may be an antenna configured to transmit and/or receive radio frequency (RF) signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. The transmit/receive element 36 may be configured to transmit and/or receive any combination of wireless or wired signals.

In addition, although the transmit/receive element 36 is depicted in FIG. 2 as a single element, the node 30 may include any number of transmit/receive elements 36. More specifically, the node 30 may employ multiple-input and multiple-output (MIMO) technology. Thus, in an embodiment, the node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the node 30 may have multi-mode capabilities. Thus, the transceiver 34 may include multiple transceivers for enabling the node 30 to communicate via, for example, Universal Terrestrial Radio Access (UTRA) and IEEE 802.11 protocols.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the node 30, such as on a server (e.g., the server 16) or a home computer.

The processor 32 may receive power from the power source 48 and may be configured to distribute and/or control the power to the other components in the node 30. The power source 48 may be any suitable device for powering the node 30. For example, the power source 48 may include one or more dry cell batteries (e.g., nickel-cadmium (Ni-Cad), nickel-zinc NiZn), nickel metal hydride (NiMH), lithium-ion (Li-ion), etc.), solar cells, fuel cells, and the like.

The processor 32 may also be coupled to the GPS chipset 50, which may be configured to provide location information (e.g., longitude and latitude) regarding the current location of the node 30. The node 30 may acquire location information by way of any suitable location-determination method while remaining consistent with an embodiment.

The processor 32 may further be coupled to other peripherals 52, which may include one or more software and/or hardware modules that provide additional features, functionality, and/or wired or wireless connectivity. For example, the peripherals 52 may include an Inertial Measurement Unit (IMU), light sensor, microphone(s), environmental sensor(s) (e.g., for measuring temperature, pressure, and/or humidity), a proximity sensor, a satellite transceiver, an image sensor (e.g., for capturing photos and/or videos, universal serial bus (USB) ports, and various other interconnect interfaces. The peripherals 52 may also include a vibration device, a television transceiver, a hands-free headset, a Bluetooth® module for wireless communication, a frequency modulated (FM) radio unit, a digital music player, a media player, a video game player module, an Internet browser, and other similar functionalities.

The memory (e.g., the non-removable memory 44) may include an NLU model(s) 54. Various implementations of the NLU model 54 are possible. For example, the NLU model 54 may be a deep learning network, large language model, classifier, transformer-based model (or other attention-based model), multi-layer perceptron, or other feed-forward networks, etc. As described in further detail below, the NLU model 54 may be trained (e.g., via supervised or unsupervised learning techniques) using training utterances that are labeled (e.g., automatically and/or manually) according to their intent. The trained NLU model 54 may receive as input an utterance (e.g., a verbal message) and generate as output an intent with which the utterance is most likely to be associated.

The memory may also include preprocessing modules configured to handle tasks for preparing training data for training the NLU model 54, such as tokenization, which splits text into individual units such as words or subword units, and normalization, which standardizes text by removing punctuation or converting characters to lowercase. The memory may also include feature extraction modules configured to capture important linguistic properties from the preprocessed input, which may include syntactic information (e.g., part-of-speech tags and dependency parse trees) and semantic representations (e.g., word embeddings or contextualized word representations generated by techniques such as Word2Vec or Bidirectional Encoder Representations from Transformers (BERT)) for training the NLU model 54.

The node 30 may be embodied in other apparatuses or devices, such as a sensor, consumer electronics, a wearable device such as a smart watch or smart clothing, a medical or eHealth device, a robot, industrial equipment, a drone, vehicles such as cars, trucks, trains, boats, aircraft and the like. The node 30 may connect to other components, modules, or systems of such apparatuses or devices via one or more interconnect interfaces, such as an interconnect interface that may comprise one of the peripherals 52.

Figure 3:
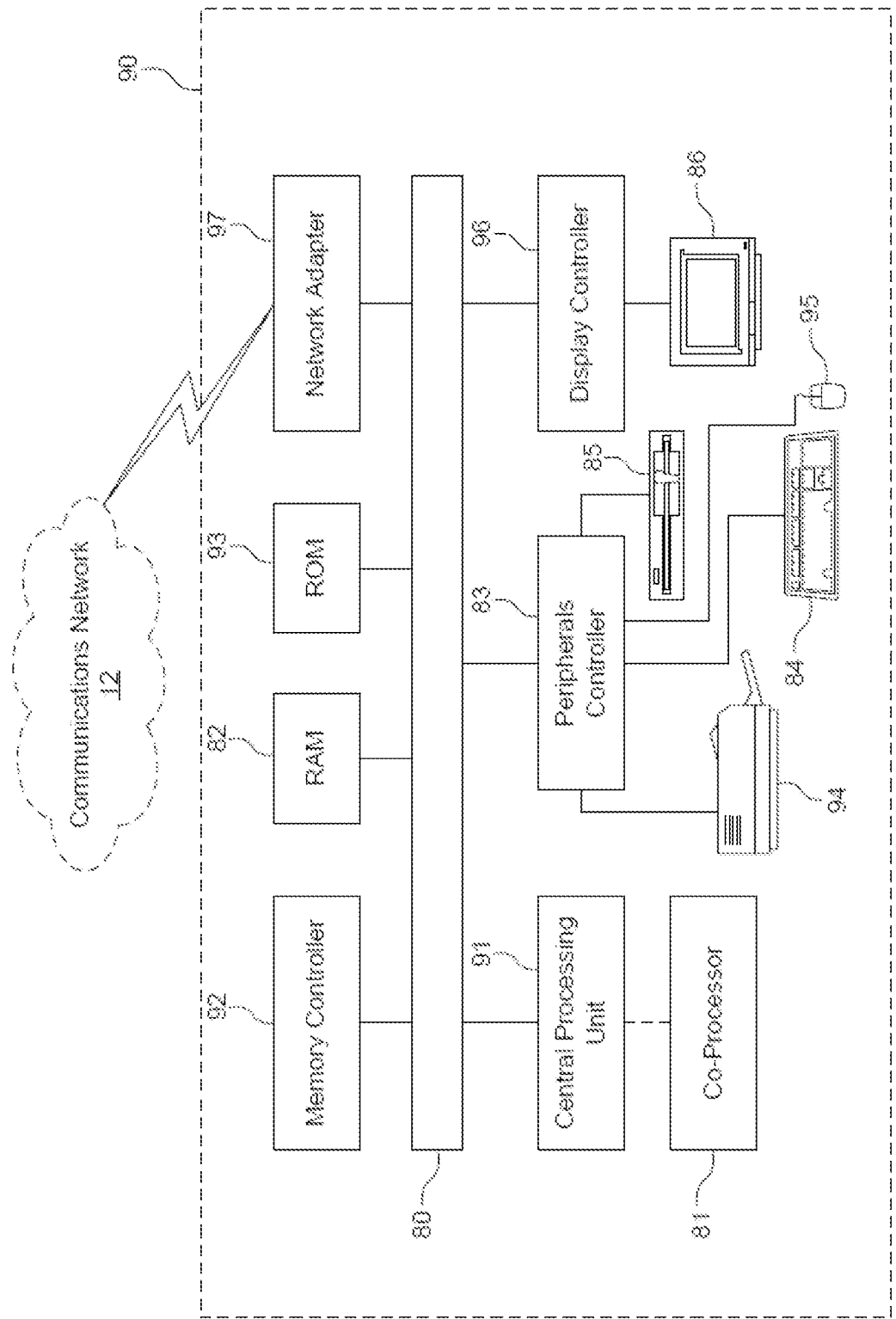
FIG. 3 illustrates a block diagram of an exemplary computing system in accordance with one or more implementations of the present disclosure.

FIG. 3 is a block diagram of an exemplary computing system 90 that may be used to implement one or more nodes 30 (e.g., clients, servers, or proxies) of a network 12.

The computing system 90 may include a computer (e.g., electronic device 14) or server (e.g., server 16) and may be controlled by computer-readable instructions, which may be in the form of software stored in memory. Such computer-readable instructions may be executed within a processor, such as a central processing unit (CPU) 91, to cause the computing system 90 to effectuate various operations. In many known workstations, servers, and personal computers, the CPU 91 is implemented by a single-chip CPU called a microprocessor. In other machines, the CPU 91 may comprise multiple processors. A co-processor 81 is an optional processor, distinct from the CPU 91 that performs additional functions or assists the CPU 91.

In operation, the CPU 91 fetches, decodes, executes instruction(s), and transfers information to and from other resources via the main data-transfer path of the computing system 90, a system bus 80. Such a system bus 80 connects the components in the computing system 90 and defines the medium for data exchange. The system bus 80 typically includes data lines for sending data, address lines for sending addresses, and control lines for sending interrupts and for operating the system bus 80. An example of such a system bus 80 is the PCI (Peripheral Component Interconnect) bus.

Memories coupled to the system bus 80 include RAM 82 and ROM 93. Such Memories include circuitry that allows information to be stored and retrieved. The ROM 93 generally contains stored data that cannot easily be modified. Data stored in the RAM 82 may be read or changed by the CPU 91 or other hardware devices. Access to the RAM 82 and/or the ROM 93 may be controlled by a memory controller 92. The memory controller 92 may provide an address translation function that translates virtual addresses into physical addresses as instructions are executed. The memory controller 92 may also provide a memory protection function that isolates processes within the system and isolates system processes from user processes. Thus, a program running in a first mode may access only memory mapped by its own process virtual address space. It cannot access memory within another process's virtual address space unless memory sharing between the processes has been set up.

In addition, the computing system 90 may contain a peripherals controller 83 responsible for communicating instructions from the CPU 91 to peripherals, such as a printer 94, a keyboard 84, a mouse 95, and a disk drive 85.

A display 86, which may be controlled by a display controller 96, may be used to display visual output generated by the computing system 90. Such visual output may include text, graphics, animated graphics, and video. The display 86 may be implemented with a CRT-based video display, an LCD-based flat-panel display, a touch-panel, and/or the like. The display controller 96 includes electronic components for generating image/video signals that are sent to the display 86.

Further, the computing system 90 may contain communication circuitry, such as a network adaptor 97, that may be used to connect the computing system 90 to an external communications network, such as the network 12, to enable the computing system 90 to communicate with other nodes of the network.

Figure 4:
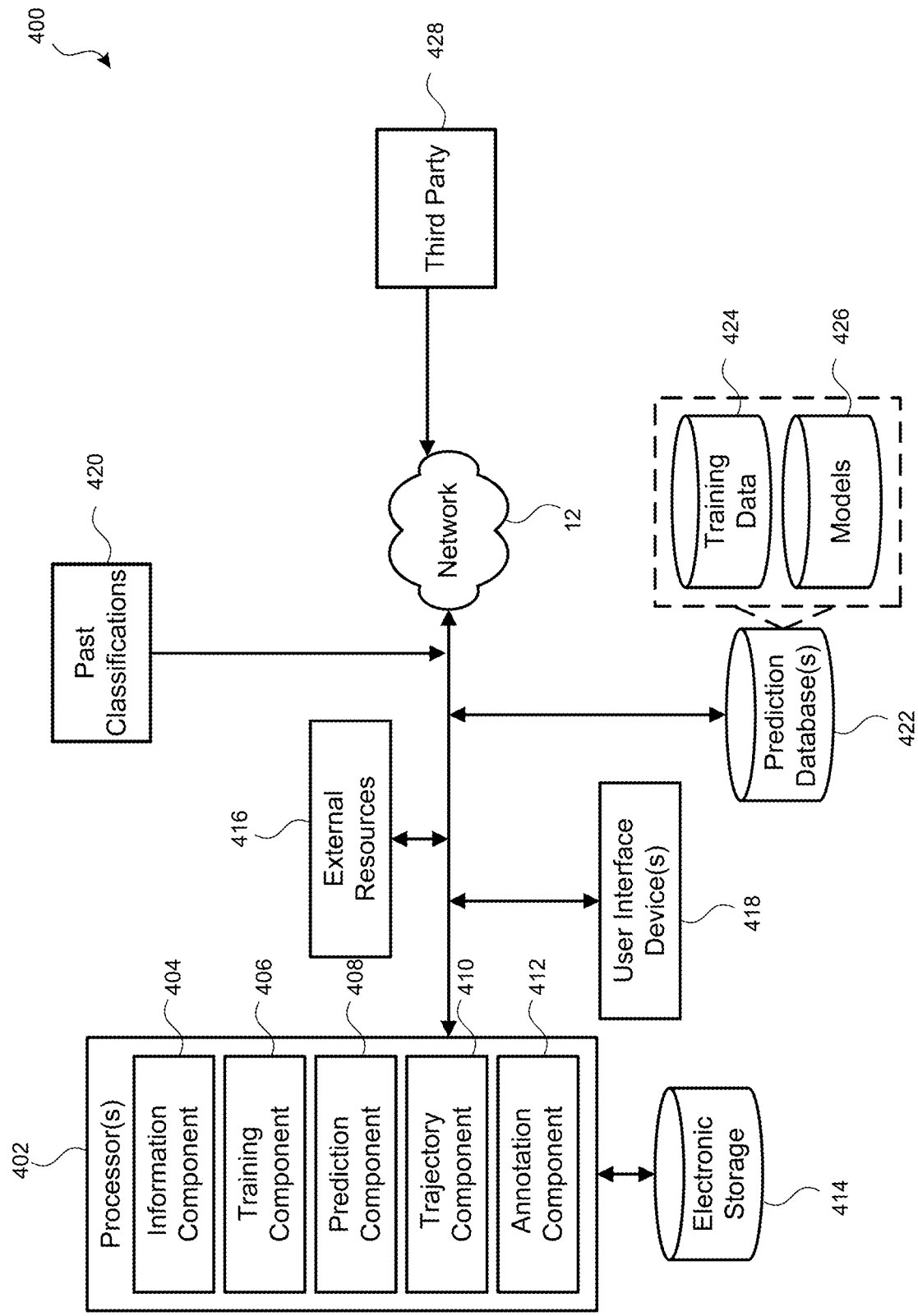
FIG. 4 illustrates a block diagram of an exemplary system configured to train one or more machine learning models in accordance with one or more implementations of the present disclosure.

FIG. 4 illustrates a block diagram of an exemplary system 400 configured to train one or more machine learning models in accordance with one or more implementations of the present disclosure. The system 400 may be embodied by, for example, the electronic device 14 and/or the server 16.

As envisaged in the present disclosure, and particularly in regard to the NLU model 54 shown in the exemplary embodiment in FIG. 2, the terms artificial neural network (ANN) and neural network (NN) may be used interchangeably. An ANN may be configured to determine a classification (e.g., intent) based on identified information. An ANN is a network or circuit of artificial neurons or nodes, and it may be used for predictive modeling. The prediction models may be and/or include one or more neural networks (e.g., deep neural networks, artificial neural networks, or other neural networks), other machine learning (ML) models, or other prediction/classification models.

Some implementations of ANNs may apply a weight and transform the input data by applying a function, where this transformation is a neural layer. The function may be linear or, more preferably, a nonlinear activation function, such as a logistic sigmoid, Tanh, or rectified linear unit (ReLU) function. Intermediate outputs of one layer may be used as the input into a next layer. The neural network through repeated transformations learns multiple layers that may be combined into a final layer that makes predictions. This training (i.e., learning) may be performed by varying weights or parameters to minimize the difference between predictions and expected values. In some embodiments, information may be fed forward from one layer to the next. In these or other embodiments, the neural network may have memory or feedback loops that form, e.g., a neural network. Some embodiments may cause parameters to be adjusted (e.g., via back propagation).

An ANN may be characterized by features of its model, the features including an activation function, a loss or cost function, a learning algorithm, an optimization algorithm, and so forth. The structure of an ANN may be determined by a number of factors, including the number of hidden layers, the number of hidden nodes included in each hidden layer, input feature vectors, target feature vectors, and so forth. Hyperparameters may include various parameters which need to be initially set for learning, much like the initial values of model parameters. The model parameters may include various parameters sought to be determined through learning. In an exemplary embodiment, hyperparameters are set before learning and model parameters can be set through learning to specify the architecture of the ANN.

Learning rate and accuracy of an ANN may rely not only on the structure and learning optimization algorithms of the ANN but also on the hyperparameters thereof. Therefore, in order to obtain a good learning model, it is important to choose a proper structure and learning algorithms for the ANN, but also to choose proper hyperparameters.

The hyperparameters may include initial values of weights and biases between nodes, mini-batch size, iteration number, learning rate, and so forth. Furthermore, the model parameters may include a weight between nodes, a bias between nodes, and so forth.

In general, the ANN is first trained by experimentally setting hyperparameters to various values. Based on the results of training, the hyperparameters can be set to optimal values that provide a stable learning rate and accuracy.

A convolutional neural network (CNN) may comprise an input and an output layer, as well as multiple hidden layers. The hidden layers of a CNN typically comprise a series of convolutional layers that convolve with a multiplication or other dot product. The activation function is commonly a ReLU layer and is subsequently followed by additional convolutions such as pooling layers, fully connected layers and normalization layers, referred to as hidden layers because their inputs and outputs are masked by the activation function and final convolution.

The CNN computes an output value by applying a specific function to the input values coming from the receptive field in the previous layer. The function that is applied to the input values is determined by a vector of weights and a bias (typically real numbers). Learning, in a neural network, progresses by making iterative adjustments to these biases and weights. The vector of weights and the bias are called filters and represent particular features of the input (e.g., a particular shape).

In some embodiments, the learning of models 426 may be of reinforcement, supervised, semi-supervised, and/or unsupervised type. For example, there may be a model for certain predictions that is learned with one of these types but another model for other predictions may be learned with another of these types.

Supervised learning is the ML task of learning a function that maps an input to an output based on example input-output pairs. It may infer a function from labeled training data comprising a set of training examples. In supervised learning, each example is a pair consisting of an input object (typically a vector) and a desired output value (the supervisory signal). A supervised learning algorithm analyzes the training data and produces an inferred function, which can be used for mapping new examples. And the algorithm may correctly determine the class labels for unseen instances.

Unsupervised learning is a type of ML task that looks for previously undetected patterns in a dataset with no pre-existing labels. In contrast to supervised learning, which usually makes use of human-labeled data, unsupervised learning does not and may employ principal component analysis (e.g., to preprocess and reduce the dimensionality of high-dimensional datasets while preserving the original structure and relationships inherent to the original dataset) and cluster analysis (e.g., to identify commonalities in the data and reacts based on the presence or absence of such commonalities in each new piece of data).

Semi-supervised learning makes use of supervised and unsupervised techniques described above. The supervised and unsupervised techniques may be split evenly for semi-supervised learning. Alternatively, semi-supervised learning may involve a certain percentage of supervised techniques and a remaining percentage involving unsupervised techniques.

ML model(s) 426 may analyze made predictions against a reference set of data called the validation set. In some use cases, the reference outputs resulting from the assessment of made predictions against a validation set may be provided as an input to the prediction models, which the prediction model may utilize to determine whether its predictions are accurate, to determine the level of accuracy or completeness with respect to the validation set, or to make other determinations. Such determinations may be utilized by the prediction models to improve the accuracy or completeness of their predictions. In another use case, accuracy or completeness indications with respect to the prediction models' predictions may be provided to the prediction model, which, in turn, may utilize the accuracy or completeness indications to improve the accuracy or completeness of its predictions with respect to input data. For example, a labeled training dataset may enable model improvement. That is, the training model may use a validation set of data to iterate over model parameters until the point where it arrives at a final set of parameters/weights to use in the model.

In some embodiments, training component 406 in the system 400 illustrated in FIG. 4 may implement an algorithm for building and training one or more deep neural networks. A used model may follow this algorithm and already be trained on data. In some embodiments, training component 406 may train a deep learning model on training data 424 providing even more accuracy after successful tests with these or other algorithms are performed and after the model is provided a large enough dataset.

In an exemplary embodiment, a model implementing a neural network may be trained using training data 424. For example, the training data obtained from prediction database 422 and may comprise hundreds, thousands, or even many millions of pieces of information. The training data may include past classifications 420 associated with the training data 424. Model parameters from the training data 424 and/or past classifications 420 may include, but is not limited to, domain and intent. Weights for each of the model parameters may be adjusted through training.

The training data 424 may be split between training, validation, and test sets in any suitable fashion. For example, some embodiments may use about 60% or 80% of the training utterances with known intents for training or validation, and the other about 40% or 20% may be used for validation or testing. In another example, training component 406 may randomly split the training data 424, the exact ratio of training versus test data varies throughout. When a satisfactory model is found, training component 406 may train a model 426 on 95% of the training data and validate the model 426 further on the remaining 5%.

The validation set may be a subset of the training data 424, which is kept hidden from the model to test accuracy of the model 426. The test set may be a dataset, which is new to the model 426 to test accuracy of the model 426. The training data 424 used to train model(s) 426 may leverage, via training component 406, an SQL server and a Pivotal Greenplum database for data storage and extraction purposes.

In some embodiments, training component 406 may be configured to obtain training data 424 from any suitable source, e.g., via prediction database 422, electronic storage 414, external resources 416, network 12, and/or user interface (UI) device(s) 418 (e.g., speaker/microphone 38, keypad 40, and/or display/touchpad/indicators 42). The training data 424 may comprise, a type of protocol, source Internet Protocol (IP) address, destination IP address, source and destination port numbers, associated encrypted pathway, provider of the encrypted pathway, source geography, cadence, content, time of day, etc.).

In some embodiments, training component 406 may enable one or more models 426 to be trained. The training of the neural networks may be performed via several iterations. For each training iteration, a classification prediction (e.g., output of a layer) of the neural network(s) may be determined and compared to the corresponding, known classification. Once trained, the model(s) 426 may be stored in prediction database 422 and then used to classify received utterances from third parties 428.

Electronic storage 414 may include electronic storage media that electronically stores information. The electronic storage media of electronic storage 414 may comprise system storage that is provided integrally (i.e., substantially non-removable) with a system and/or removable storage that is removably connectable to a system via, for example, a port (e.g., a USB port, a firewire port, etc.) or a drive (e.g., a disk drive, etc.). Electronic storage 414 may be (in whole or in part) a separate component within the system, or electronic storage 414 may be provided (in whole or in part) integrally with one or more other components of a system (e.g., a UI device 418, processor 402, etc.). In some embodiments, electronic storage 414 may be located in a server together with processor 402, in a server that is part of external resources 416, in UI devices 418, and/or in other locations. Electronic storage 414 may comprise a memory controller and one or more of optically readable storage media (e.g., optical disks, etc.), magnetically readable storage media (e.g., magnetic tape, magnetic hard drive, floppy drive, etc.), electrical charge-based storage media (e.g., EPROM, RAM, etc.), solid-state storage media (e.g., flash drive, etc.), and/or other electronically readable storage media. Electronic storage 414 may store software algorithms, information obtained and/or determined by processor 402, information received via UI devices 418 and/or other external computing systems, information received from external resources 416, and/or other information that enables system to function as described herein.

External resources 416 may include sources of information (e.g., databases, websites, etc.), external entities participating with a system, one or more servers outside of a system, a network, electronic storage, equipment related to Wi-Fi technology, equipment related to Bluetooth® technology, data entry devices, a power supply (e.g., battery powered or line-power connected, such as directly to 110 volts AC or indirectly via AC/DC conversion), a transmit/receive element (e.g., an antenna configured to transmit and/or receive wireless signals), a network interface controller (NIC), a display controller, a graphics processing unit (GPU), and/or other resources. In some implementations, some or all of the functionality attributed herein to external resources 416 may be provided by other components or resources included in the system. Processor 402, external resources 416, UI device 418, electronic storage 414, a network, and/or other components of the system may be configured to communicate with each other via wired and/or wireless connections, such as a network (e.g., a local area network (LAN), the Internet, a wide area network (WAN), a radio access network (RAN), a public switched telephone network (PSTN), etc.), cellular technology (e.g., GSM, UMTS, LTE, 5G, etc.), Wi-Fi technology, another wireless communications link (e.g., RF, microwave, infrared (IR), ultraviolet (UV), visible light, cm wave, mm wave, etc.), a base station, and/or other resources.

UI device(s) 418 of the system may be configured to provide an interface between one or more clients/users and the system 400. The UI device(s) 418 may be the same or different device as the system 400. The UI devices 418 may include client devices such as computers, tablets and smart devices. UI devices 418 may be configured to provide information to and/or receive information from the one or more users/clients. UI devices 418 may include a UI and/or other components. The UI may be and/or include a graphical UI configured to present views and/or fields configured to receive entry and/or selection with respect to particular functionality of the system, and/or provide and/or receive other information. In some embodiments, the UI of UI devices 418 may include a plurality of separate interfaces associated with processors 402 and/or other components of the system. Examples of interface devices suitable for inclusion in UI device 418 include a touch screen, a keypad, touch sensitive and/or physical buttons, switches, a keyboard, knobs, levers, a display, speakers, a microphone, an indicator light, an audible alarm, a printer, and/or other interface devices. The present disclosure also contemplates that UI devices 418 include a removable storage interface. In this example, information may be loaded into UI devices 418 from removable storage (e.g., a smart card, a flash drive, a removable disk) that enables users to customize the implementation of UI devices 418.

In some embodiments, UI devices 418 are configured to provide a UI, processing capabilities, databases, and/or electronic storage to the system. As such, UI devices 418 may include processors 402, electronic storage 414, external resources 416, and/or other components of the system. In some embodiments, UI devices 418 are connected to a network (e.g., the Internet). In some embodiments, UI devices 418 do not include processor 402, electronic storage 414, external resources 416, and/or other components of system, but instead communicate with these components via dedicated lines, a bus, a switch, network, or other communication means. The communication may be wireless or wired. In some embodiments, UI devices 418 are laptops, desktop computers, smartphones, tablet computers, and/or other UI devices on the network.

Data and content may be exchanged between the various components of the system through a communication interface and communication paths using any one of a number of communications protocols. In one example, data may be exchanged employing a protocol used for communicating data across a packet-switched internetwork using, for example, the Internet Protocol Suite, also referred to as TCP/IP. The data and content may be delivered using datagrams (or packets) from the source host to the destination host solely based on their addresses. For this purpose, the IP defines addressing methods and structures for datagram encapsulation. Of course, other protocols also may be used. Examples of an Internet protocol include Internet Protocol version 4 (IPv4) and Internet Protocol version 6 (IPv6).

In some embodiments, processor(s) 402 may form part (e.g., in a same or separate housing) of a user device, a consumer electronics device, a mobile phone, a smartphone, a personal data assistant, a digital tablet/pad computer, a wearable device (e.g., watch), AR goggles, VR goggles, a reflective display, a personal computer, a laptop computer, a notebook computer, a work station, a server, a high performance computer (HPC), a vehicle (e.g., embedded computer, such as in a dashboard or in front of a seated occupant of a car or plane), a game or entertainment system, a set-top-box, a monitor, a television (TV), a panel, a spacecraft, or any other device. In some embodiments, processor 402 is configured to provide information processing capabilities in the system. Processor 402 may comprise one or more of a digital processor, an analog processor, a digital circuit designed to process information, an analog circuit designed to process information, a state machine, and/or other mechanisms for electronically processing information. Although processor 402 is shown in FIG. 4 as a single entity, this is for illustrative purposes only. In some embodiments, processor 402 may comprise a plurality of processing units. These processing units may be physically located within the same device (e.g., a server), or processor 402 may represent processing functionality of a plurality of devices operating in coordination (e.g., one or more servers, UI devices 418, devices that are part of external resources 416, electronic storage 414, and/or other devices).

As shown in FIG. 4, processor 402 may be configured via machine-readable instructions to execute one or more computer program components. The computer program components may comprise one or more of information component 404, training component 406, prediction component 408, annotation component 412, trajectory component 410, and/or other components. Processor 402 may be configured to execute components 404, 406, 408, 410, and/or 412 by software, hardware, firmware, and/or other mechanisms for configuring processing capabilities on processor 402.

It should be appreciated that although components 404, 406, 408, 410, and 412 are illustrated in FIG. 4 as being co-located within a single processing unit, in embodiments in which processor 402 comprises multiple processing units, one or more of components 404, 406, 408, 410, and/or 412 may be located remotely from the other components. For example, in some embodiments, each of processor components 404, 406, 408, 410, and 412 may comprise a separate and distinct set of processors. The description of the functionality provided by the different components 404, 406, 408, 410, and/or 412 described below is for illustrative purposes, and is not intended to be limiting, as any of components 404, 406, 408, 410, and/or 412 may provide more or less functionality than is described. For example, one or more of components 404, 406, 408, 410, and/or 412 may be eliminated, and some or all of its functionality may be provided by other components 404, 406, 408, 410, and/or 412. As another example, processor 402 may be configured to execute one or more additional components that may perform some or all of the functionality attributed below to one of components 404, 406, 408, 410, and/or 412.

Methods and Systems for Training and Deploying NLU Models

Figure 5:
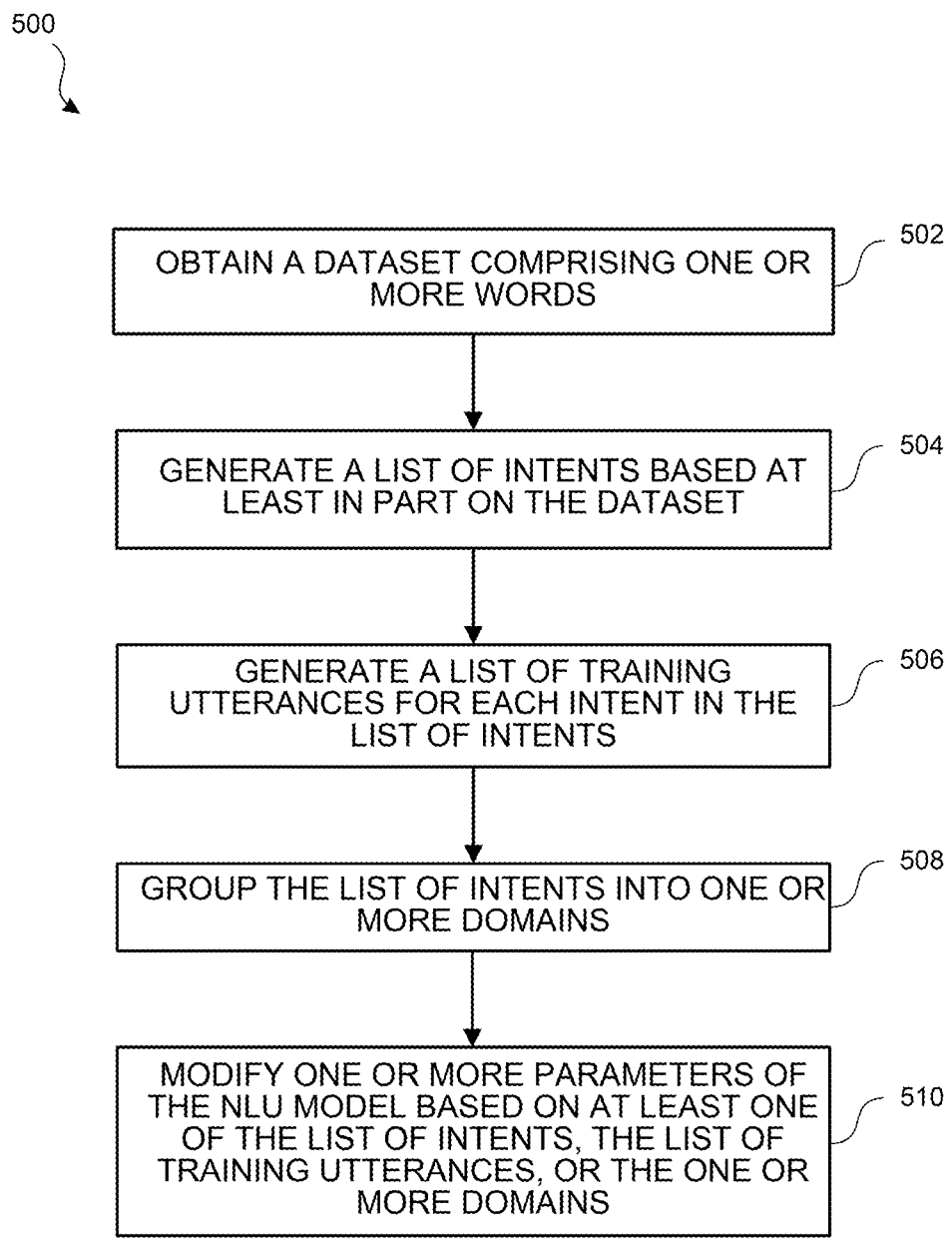
FIG. 5 illustrates a flowchart of an exemplary process for training an NLU model in accordance with one or more implementations of the present disclosure.

FIG. 5 illustrates a flowchart of an exemplary process 500 for training an NLU model in accordance with one or more implementations of the present disclosure. For explanatory purposes, the process 500 may primarily be described herein with reference to the electronic device 14 of FIG. 1. However, the process 500 is not limited to the electronic device 14 and one or more blocks of the process 500 may be performed by one or more other components of other suitable devices. Further, for explanatory purposes, the blocks of the process 500 are described herein as occurring in serial, or linearly. However, multiple blocks of the process 500 may occur in parallel. In addition, the blocks of the process 500 need not be performed in the order shown and/or one or more blocks of the process 500 need not be performed and/or may be replaced by other operations.

At block 502, the electronic device 14 may download, receive, access, or otherwise obtain a dataset that includes one or more words. The dataset may be a collection of utterances. The dataset may be derived from various sources, such as transcripts, chat logs, or manual generation. The dataset may be preprocessed to remove non-meaningful words, such as stop words or undefined words. The dataset may be tokenized to break down text into small parts called tokens, which can be as small as individual words or as large as sentences. The dataset (e.g., the tokens) may be vectorized to convert words into numerical vectors using methods such as Bag of Words (BoW), TF-IDF, or words embeddings like Word2Vec, GloVe, or BERT.

At block 504, the electronic device 14 may generate a list of intents based at least in part on the dataset. Generating the list of intents may occur automatically upon obtaining the dataset. The intent of each utterance may be considered the label of the utterance from which it was generated and/or to which it corresponds. Each intent may be associated with an action or topic within a domain. To identify intents from the dataset, the electronic device 14 may measure the overlap and/or steepness of one or more words of the dataset.

The overlap value between two words includes the likelihood of a word occurring in an utterance, given the first word has already been said in that utterance. The steepness value for a single word is a measure of the concentration of overlapping words, or how quickly the overlap decreases between the word and its paired words. High steepness word pairs may use more specific language and can therefore be isolated more easily than other pairs. For example, the word "activate" may overlap most frequently in customer utterances with words such as "card," "debit," and "new." Overall, "activate" is a word with high steepness as it only has high overlap with a few words and mostly appears in connection with one specific action. In comparison, the word "account" may have a consistently low overlap with the words "checking," "money," and "payment." These pairs are not highly correlated with one specific customer action, so "account" is a word with low steepness.

A predetermined number of words from the dataset may be selected based on their overlap and/or steepness values. For example, the 300 words from the dataset with highest steepness, in conjunction with their highest overlapping words (if any), may be selected to form the list of intents. In some implementations, all words with a steepness greater than a steepness threshold and/or all words with an overlap greater than an overlap threshold may be selected to form the list of intents.

In some implementations, synonyms (e.g., words/phrases that have the same meaning) may be consolidated into a single intent. For example, the phrases "activate card" and "card activation" may be synonyms because they are merely the reverse of each other. In instances in which there are intents that are synonyms, the most frequently used in the dataset may be selected as the intent.

At block 506, the electronic device 14 may group the list of intents into one or more domains to maximize the overall classification rate and accuracy of the NLU model. To maximize the classification rate and accuracy of the NLU model, the intents may be nested and stacked. The number of domains may be predetermined and/or determined based on the dataset (e.g., the number of unique topics identified in the dataset).

Nesting may include group intents of similar topics (e.g., "order new card" and "activate card") and/or sharing a common topic together into a single intent in an upper-level domain (e.g., "Card") to increase the classification rate that may otherwise suffer due to the number of similar intents in the domain. Nesting intents may be done at the expense of granularity in determining the true intent, but in practice may be used as a sorting domain to get the utterance to the most correct group of intents in terms of the topic of the utterance.

Stacking may include grouping intents of similar meaning (e.g., about the same product or setting (e.g., "view beneficiaries," "add beneficiaries," and "remove beneficiaries")) into a unified intent (e.g., "beneficiaries") to prevent their underutilization that may occur due to the similarity in the language between the intents. Stacking intents may be done at the expense of granularity in determining the true intent, but some implementations may present a menu with multiple, more granular intent options after classifying the utterance to a stacked intent to disambiguate the utterance's true intent.

At block 508, the electronic device 14 may generate a list of training utterances for each intent in the list of intents. Generating the list of training utterances may occur automatically upon generating the list of intents. Each training utterance may be associated with an intent. The word(s) representing the intent may be threaded through each training utterance corresponding to that intent. For example, if the intent is "activate card," then the training utterances generated for "activate card" may include the words "activate" and "card."

Generating training utterances for an intent may include generating a list of permutations of the intent and/or any training utterances associated with the intent. For example, "transfer money" and "money transfer" may be training utterances for the "transfer money" intent.

Generating training utterances for an intent may also or instead include common misspellings of the intent and/or any training utterances associated with the intent (e.g., from a predefined list of misspellings). For example, "transfers money" and "transfer money" may be training utterances for the "transfer money" intent.

Generating training utterances for an intent may also or instead include injecting one or more adjectives into the intent and/or any training utterances associated with the intent (e.g., from a predefined list of adjectives). For example, "activate new card" may be a training utterance for the "activate card" intent.

Generating training utterances for an intent may also or instead include injecting one or more nouns into the intent and/or any training utterances associated with the intent (e.g., from a predefined list of nouns). For example, "activate debit card" or "activate gift card" may be training utterances for the "activate card" intent.

Generating training utterances for an intent may also or instead include injecting one or more verbs into the intent and/or any training utterances associated with the intent (e.g., from a predefined list of verbs). For example, "find routing number" and "get routing number" may be training utterances for the "get number" intent.

Generating training utterances may also or instead include prepending a starter phrase into the intent and/or any training utterances associated with the intent (e.g., from a predefined list of starter phrases). A starter phrase may include any common way for a user to begin an utterance, such as for a particular utterance. For example, for the "unlock account" intent, starters may include "my account is locked" and "help me" resulting in training utterances "my account is locked, please unlock my account" and "help me unlock account," respectively.

Generating training utterances may also or instead include appending a finisher phrase into the intent and/or any training utterances associated with the intent (e.g., from a predefined list of finisher phrases). A finisher phrase may include any common way for a user to complete an utterance, such as for a particular utterance. For example, for the "routing number" intent, finishers may include "what's up with that?" or "to set up direct deposit" resulting in training utterances "routing number, what's up with that?" and "I need my routing number to set up direct deposit." respectively.

In some implementations, the electronic device 14 may automatically add words (e.g., stop words) to make the automatically generated training utterances more natural (e.g., from a predefined list of stop words). In some implementations, the training utterances may be generated by a generative pretrained transformer (GPT) prompted to generate one or more utterances that include the intent and a synonym, modifier, verb, starter, and/or finisher.

If block 508 results in too many training utterances (e.g., more than memory limits will allow), in some implementations, the list of training utterances may be truncated. In a first truncation approach, each intent may have the same number of training utterances (e.g., N utterances per intent), such as by selecting only the first N training utterances. This may cause the domains to each have different number of training utterances depending on how many intents are nested in the domain, which may cause certain groups of intents to have more representation than others when training the NLU model. In a second truncation approach, each domain may have the same number of training utterances, regardless of how many intents are nested within the domain. This may cause some intents to have more representation in their respective domain than others.

At block 510, the electronic device 14 may modify one or more parameters of (e.g., train) the NLU model based on the list of intents, the list of training utterances, and/or the one or more domains.

The NLU model may include characteristics such as structure topology, neuron types, renormalization layers, etc. For example, an artificial neural network may be configured to determine a classification (e.g., the intent) based on an input utterance. An artificial neural network includes a network or circuit of artificial neurons or nodes for solving AI problems. Such artificial networks may be used for intent classification.

Classification models employed in one or more embodiments may be and/or include one or more neural networks (e.g., deep neural networks, artificial neural networks, or other neural networks), other machine learning models, or other classifiers. As an example, the neural networks referred to variously herein may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections may be enforcing or inhibitory in their effect on the activation state of connected neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from input layers to output layers). In some embodiments, back propagation techniques may be utilized to train the neural networks, where forward stimulation is used to reset weights on the "front" neural units. In some embodiments, stimulation and inhibition for neural networks may be more free-flowing, with connections interacting in a more chaotic and complex fashion.

A CNN may include a sequence of hidden layers, such as convolutional layers interspersed with activation functions. Typical layers of a CNN may thus include a convolutional layer, an activation layer batch normalization, and a pooling layer. Each output from one of these layers is an input for a next layer in the stack, the next layer being, e.g., another one of the same layer or a different layer. For example, a CNN may have two sequential convolutional layers. In another example, a pooling layer may follow a convolutional layer. When many hidden, convolutional layers are combined, this may be referred to as deep stacking. After each convolutional layer, a nonlinear (activation) layer may be applied immediately afterward, such as a ReLU, Softmax, Sigmoid, tanh, and/or Leaky layer.

A batch normalization layer may also be used. The batch normalization layer may be used to normalize an input layer by adjusting and scaling the activations. Batch normalization may exist before or after an activation layer. To increase the stability of a neural network, batch normalization may normalize the output of a previous activation layer by subtracting the batch mean and dividing by the batch standard deviation.

The structure of the NLU model (e.g., number of layers, types of layers, connectivity between layers, and one or more other structural aspects) may be selected, and then the parameters of each layer may be determined by training. Some embodiments may train the NLU model by dividing a training data set into a training set and an evaluation set and then using the training set to modify one or more parameters of the NLU model. Training classifiers with known data improves accuracy and quality of outputs. Training data may include the training utterances of block 506, which may be automatically generated based on the dataset of block 502.

Modifying the one or more parameters of the NLU model may be performed via supervised learning, unsupervised learning, semi-supervised learning, reinforcement learning, and/or any other training technique.

Throughout various phases of training, the NLU model may generate classifications for comparison against a reference set of data called the validation set. In some use cases, the reference outputs may be provided as inputs to the NLU model, which the NLU model may determine whether its classifications are accurate, to determine the level of accuracy or completeness with respect to the validation set data, or to make other determinations. Such determinations may be utilized by the NLU model to improve the accuracy or completeness of their classifications. In another use case, accuracy or completeness indications with respect to the NLU model's classifications may be provided to the NLU model, which, in turn, may utilize the accuracy or completeness indications to improve the accuracy or completeness of its classifications with respect to input utterances. For example, a labeled training set may enable model improvement. That is, the training model may use a validation set of data to iterate over model parameters until the point where it arrives at a final set of parameters/weights to use in the model. In short, during training, the NLU model's parameters may be adjusted to minimize a loss function, which measures the difference between the NLU model's classifications and the actual labels. Techniques for minimizing the loss function may include backpropagation and an optimization method such as Stochastic Gradient Descent.

Once the NLU model is trained based on the algorithm and training data set, the NLU model may be used to classify unlabeled data points into known classifications (e.g., domains and/or intents).

In some implementations, after the NLU model has been trained, it may be evaluated to verify its ability to accurately classify new, unseen data. Evaluation may involve validation where the NLU model's performance is measured on a validation set, which may be a part of the training data that was not used during the training process to help tune the model's hyperparameters and avoid overfitting. Evaluation may also or instead involve testing on a separate test dataset. The performance on the test set may provide an indication of how the model will perform in real-world situations. Evaluation may also or instead involve measuring performance using accuracy, precision, recall, F1 score, and/or the like. For multi-tier intent classification, confusion matrices or other multi-class classification metrics may be used.

Block 510 may be iterative, meaning it may be run several times, tweaking various parameters, thereby annealing the NLU model until it performs satisfactorily. Furthermore, the NLU model may be retrained periodically with new data to keep up with changing language use over time, for example when the data is observed to be different from the predicted parameter values. The difference may be based on the observed data failing to meet predetermined thresholds.

Figure 6:
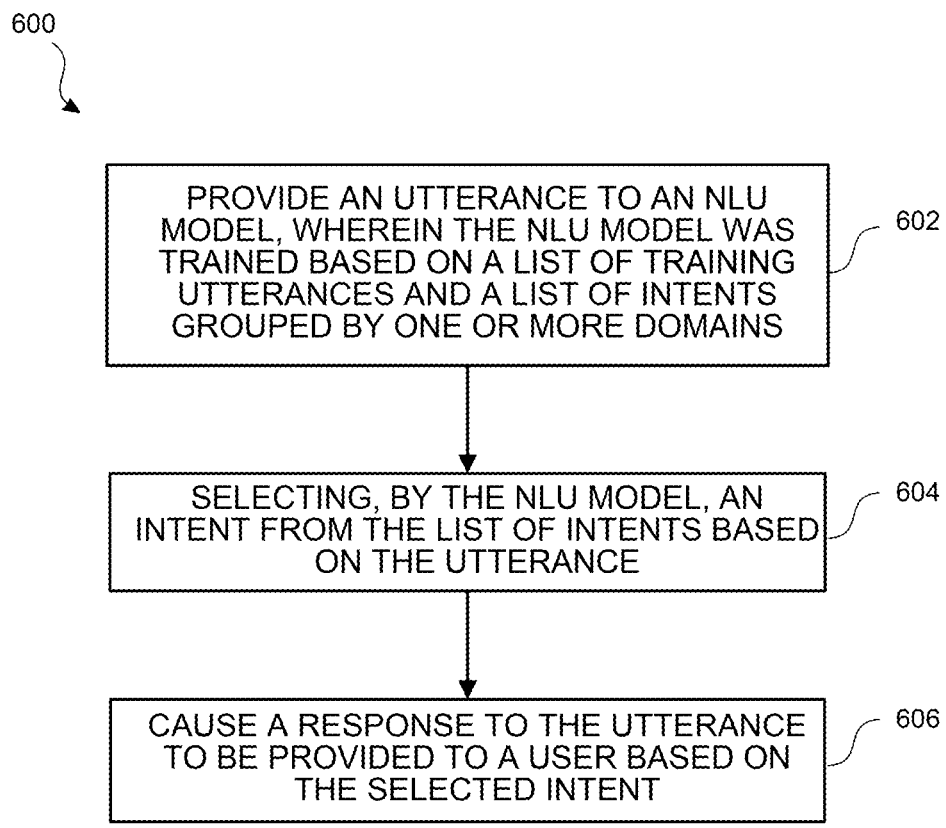
FIG. 6 illustrates a flowchart of an exemplary process for processing an utterance in accordance with one or more implementations of the present disclosure.

FIG. 6 illustrates a flowchart of an exemplary process 600 for processing an utterance in accordance with one or more implementations of the present disclosure. For explanatory purposes, the process 600 may primarily be described herein with reference to the electronic device 14 of FIG. 1. However, the process 600 is not limited to the electronic device 14 and one or more blocks of the process 600 may be performed by one or more other components of other suitable devices. Further, for explanatory purposes, the blocks of the process 600 are described herein as occurring in serial, or linearly. However, multiple blocks of the process 600 may occur in parallel. In addition, the blocks of the process 600 need not be performed in the order shown and/or one or more blocks of the process 600 need not be performed and/or may be replaced by other operations.

At block 602, an utterance may be provided to an NLU model (e.g., NLU model 54). The NLU model may be trained based on a list of training utterances and a list of intents grouped by one or more domains, as described in more detail with respect to FIG. 4 above. The utterance may be a string of natural language text input into the trained NLU model for identifying or classifying an intent of the utterance.

In some implementations, the utterance may first be preprocessed. Preprocessing may include cleaning the data to remove any unnecessary and/or redundant elements, for example, by converting text to lower/uppercase, removing stop words, correcting spelling errors, and the like.

The utterance may also or instead be tokenized to simplify the utterance for the NLU model. Tokenization may involve splitting the text into smaller parts, or 'tokens.' Tokens can be as small as subwords (subword tokenization) or as large as sentences (sentence-level tokenization).

The utterance may also or instead be normalized to transform the utterance into a standard form, which may include techniques such as stemming, which involves removing the end (e.g., -ing) or beginning (e.g., post-) of one or more words of the utterance.

The utterance may also or instead be vectorized by converting the utterance into a numerical vector, a form that machine learning models can process. Vectorization may be performed by techniques including BoW, TF-IDF, word embeddings (e.g., Word2Vec or GloVe), and/or contextual embeddings (e.g., BERT or ELMo).

At block 604, an intent may be selected by the NLU model. To select the intent, the NLU model may classify the utterance as likely belonging to an intent. To do so, the NLU model may utilize its learned parameters to predict the most likely intent. This may be done by calculating the conditional probabilities (e.g., a classification score) of different intents given the input utterance and selecting the intent with the highest probability. In a multi-class or multi-label scenario, selecting an intent could involve methods like Softmax for generating probabilities that sum to one or sigmoid functions for independent probabilities.

In some implementations, when selecting the intent, the NLU model may first select a domain. To do so, the NLU model may utilize its learned parameters to predict the most likely domain. This may be done by calculating the conditional probabilities (e.g., a domain classification score) of different domains given the input utterance and selecting the domain with the highest probability. Because there may be fewer domains than intent, the domain may be selected at a higher degree of probability. Subsequently, the NLU model may select an intent nested within the domain. To do so, the NLU model may utilize its learned parameters to predict the most likely intent corresponding to the selected domain. This may be done by calculating the conditional probabilities (e.g., an intent classification score) of different intents given the input utterance and selected domain and selecting the domain with the highest probability. Because fewer intents are nested within a particular domain than there are intents as a whole, an intent may be selected at a higher success rate than by selecting an intent without first selecting a domain.

At block 606, a response to the utterance may be provided to a user based on the selected intent. The identified intent may be mapped to a corresponding response and/or action. Intent mapping may be a direct, predetermined mapping where each intent corresponds to a single predefined response. More complex implementations may select a response from a pool of possible responses or generate a response dynamically.

More complex implementations may also consider the context of the utterance (e.g., in a conversation) when selecting and/or generating the response. Context consideration may involve maintaining a contextual state that keeps track of the conversation history and user information. The response may be selected and/or generated not only based on the utterance's intent but also considering this contextual state.

In some implementations, such as those based on deep learning, the response might not be selected but generated. Generating a response may involve a separate component or machine learning model, like a seq2seq model or a transformer model, which can generate a natural language response. The response generation model may take the identified intent (and possibly the contextual state) as input and generate the response as output. In more advanced implementations, models like GPT can be fine-tuned for response generation tasks, enabling the generation of diverse and contextually appropriate responses (e.g., utilizing banking-specific terminology in banking related tasks).

In some implementations, before the generated response is sent to the user, it may undergo a post-processing step. Post-processing may involve tasks like correcting grammar and spelling, ensuring the use of appropriate language, or adding any system-specific formatting.

Providing the response may include displaying the response in a chat window, for example, and/or it could involve more complex operations like synthesizing speech in a voice assistant. The process 600 may be repeated for one or more subsequent utterances.

Figure 7:
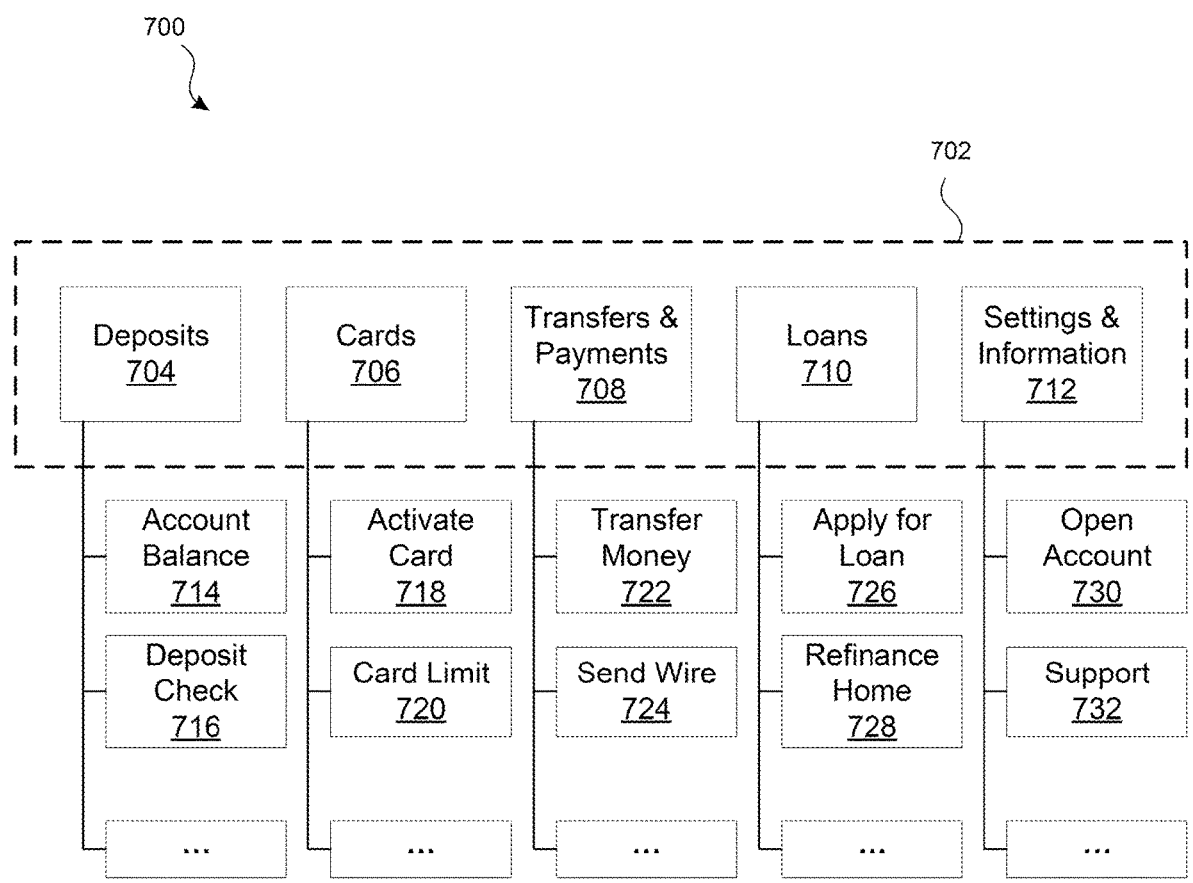
FIG. 7 illustrates an exemplary nested domain structure in accordance with one or more implementations of the present disclosure.

FIG. 7 illustrates exemplary nested domain structure 700 in accordance with one or more implementations of the present disclosure. After generating the intents from the dataset, the intents may be structured by nesting and stacking, described in more detail with respect to FIG. 4 above.

The present disclosure structures training data by creating groups of similar intents or "nested intents" in a domain that sorts and feeds utterances to more specific intents nested therein. In the domain level 702, an utterance may be scored against one or more domains (e.g., domains 704-712), each domain representing their respective nested intents (e.g., domain 704 has nested intents 714-716, domain 706 has nested intents 718-720, and so on). If the score passes the classification threshold for one of the domains, then the utterance moves to the intents nested within that domain and is scored on one or more intents within that domain.

For example, as illustrated by FIG. 7, the utterance "I want to activate my card" may be classified into the Cards domain 706 because it is more like the language in the Cards domain 706 than in any of the other domains. The utterance may then be scored against a reduced set of specific intents within the Cards domain 706 that pertain to actions with "cards" and would classify into the "Activate Card" intent 718. The goal is that since the word "card" is common to most intents in the group (e.g., the Cards domain 706), it should score equally among all intents nested in the Cards domain, forcing the NLU model to focus on the other words in the utterance (like "activate") to determine the correct specific intent.

Figure 8:
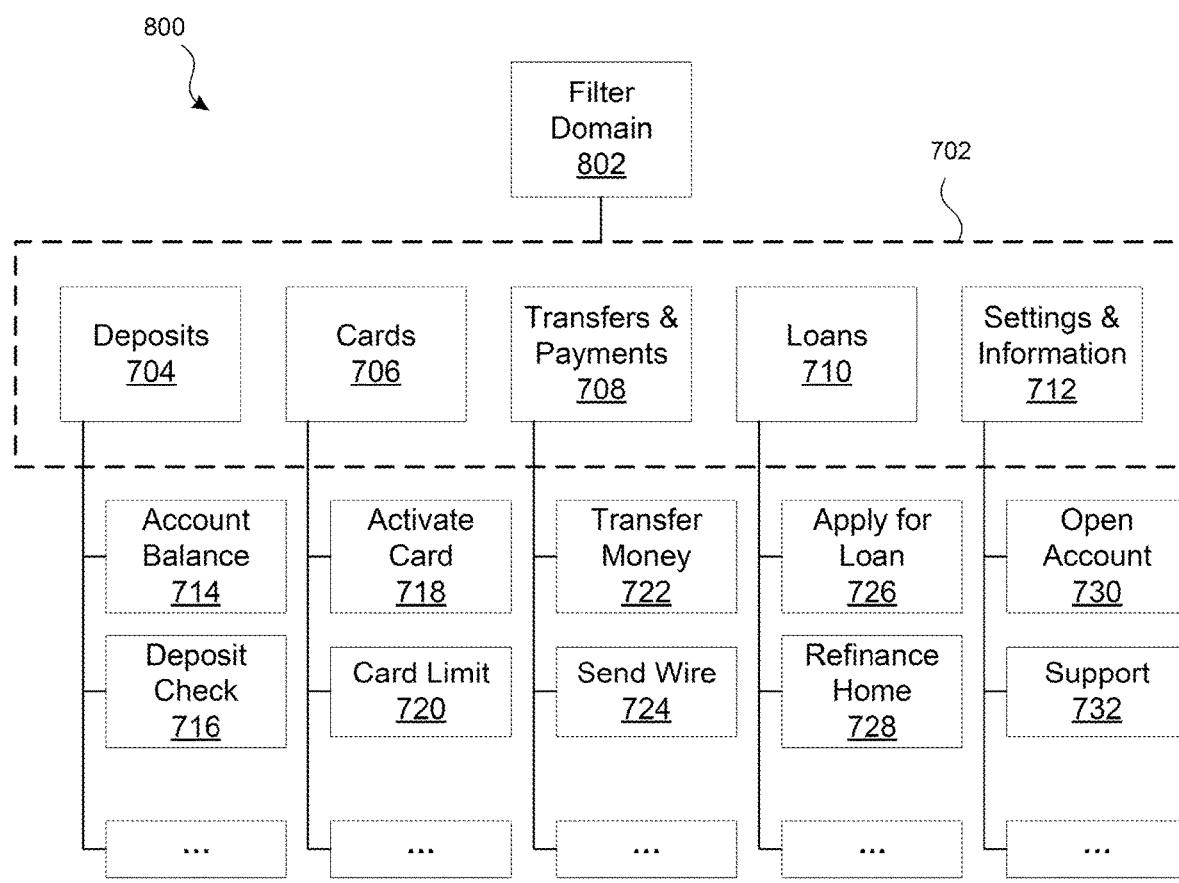
FIG. 8 illustrates an exemplary nested domain structure with a filter domain in accordance with one or more implementations of the present disclosure.

FIG. 8 illustrates exemplary nested domain structure 800 with a filter domain 802 in accordance with one or more implementations of the present disclosure. To prevent nonsense phrases (also known as "garbled" phrases) from being inappropriately classified in the domain level 702, a filter domain 802 may be added. In some implementations, the filter domain 802 may include all intents in a single level domain without any nesting. The filter domain 802 may include a low classification threshold ("filtering threshold") (e.g., at least a 7.5% probability of the utterance being related to any intent) to filter out the maximum number of nonsense phrases and the minimum number of meaningful utterances.

If the NLU model first classifies an utterance as having a probability of being associated with any intent greater than the filtering threshold, then the NLU model may proceed to determining an intent of the utterance, for example, in a manner as described above with respect to FIG. 5.

If the NLU model classifies the utterance as having a probability of being associated with any intent less than or equal to the filtering threshold, then the one or more fallback instructions may be activated to handle the unrecognized utterance. For instance, an error message may be provided to the user requesting a new utterance.

While the system and method have been described in terms of what are presently considered to be specific embodiments, the disclosure need not be limited to the disclosed embodiments. It is intended to cover various modifications and similar arrangements included within the spirit and scope of the claims the scope of which should be accorded the broadest interpretation so as to encompass all such modifications and similar structures. The present disclosure includes any and all embodiments of the following claims.

What is claimed is:

1. A method, comprising:
providing an utterance to a natural language understanding (NLU) model, wherein the NLU model is trained by:
obtaining a dataset comprising utterances, wherein the utterances comprise one or more words;
generating a list of intents by analyzing overlap and steepness values of word combinations in the dataset to identify core actions or topics to act as intents;
grouping the list of intents into one or more domains;
nesting intents sharing a common topic into a domain representing the common topic;
stacking intents similar in meaning within the domain into a unified intent;
generating a list of training utterances for each intent in the list of intents by threading words representing the intent through each training utterance corresponding to that intent;
modifying one or more parameters of the NLU model based on at least one of the list of intents, the list of training utterances, and the one or more domains;
selecting, by the NLU model, an intent by first selecting a domain and then selecting an intent from the list of intents based on the utterance; and
providing a response to the utterance based on the selected intent.

2. The method of claim 1, wherein analyzing overlap and steepness values of word combinations comprises:
determining an overlap value for each of the one or more words, wherein the overlap value is a likelihood of a word occurring in an utterance, given the first word has already been said in that utterance; and determining a steepness value for each of the one or more words, wherein the steepness value is a measure of a concentration of overlapping words.

3. The method of claim 2, wherein the list of intents and the list of training utterances are automatically generated, and wherein the list of intents is based on a selection of a predetermined number of words from the one or more words satisfying an overlap value threshold and a steepness value threshold.

4. The method of claim 2, wherein each training utterance of the list of training utterances comprises at least one intent from the list of intents.

5. The method of claim 1, wherein generating the list of training utterances for each intent is performed at least partially with a generative pretrained transformer.

6. The method of claim 1, wherein generating the list of training utterances for each intent comprises:
combining a respective intent with at least one of a synonym, modifier, verb, starter, finisher, common misspelling, noun, adjective, or stop word.

7. The method of claim 1, wherein generating the list of training utterances comprises:
truncating each respective list of training utterances associated with each respective list of intents.

8. The method of claim 7, wherein each respective truncated list of training utterances associated with each domain comprises a same number of training utterances.

9. The method of claim 1, wherein selecting, by the NLU model, the domain comprises:
generating, by the NLU model, a domain classification score for each of the one or more domains based on the utterance; and
selecting a domain from the one or more domains corresponding to a highest domain classification score.

10. The method of claim 9, wherein selecting the domain is responsive to a determination that the domain classification score is above a filtering threshold otherwise, when the domain classification score is less than the filtering threshold due to an unrecognized utterance, one or more fallback instructions are activated to handle the unrecognized utterance.

11. The method of claim 1, wherein selecting, by the NLU model, the intent comprises:
generating, by the NLU model, an intent classification score for each of the one or more intents associated with the selected domain; and
selecting the intent from the one or more intents corresponding to a highest intent classification score.

12. The method of claim 1, wherein the threading comprises ensuring that each training utterance associated with an intent includes specific words that define the intent.

13. An electronic device, comprising:
a memory comprising a natural language understanding (NLU) model; and
a processor configured to:
provide an utterance to the NLU model, wherein the NLU model is trained by:
obtaining a dataset comprising utterances, wherein the utterances comprise one or more words;
generating a list of intents by analyzing overlap and steepness values of word combinations in the dataset to identify core actions or topics to act as intents;
grouping the list of intents into one or more domains;
nesting intents sharing a common topic into a domain representing the common topic;
stacking intents similar in meaning within the domain into a unified intent;
generating a list of training utterances for each intent in the list of intents by threading words representing the intent through each training utterance corresponding to that intent; and
modifying one or more parameters of the NLU model based on at least one of the list of intents, the list of training utterances, or the one or more domains;
select, by the NLU model, an intent by first selecting a domain and then selecting an intent from the list of intents for the selected domain based on the utterance; and
provide a response to the utterance based on the selected intent.

14. The electronic device of claim 13, wherein analyzing overlap and steepness values of word combinations comprises:
determining an overlap value for each of the one or more words, wherein the overlap value is a likelihood of a word occurring in an utterance, given the first word has already been said in that utterance;
determining a steepness value for each of the one or more words, wherein the steepness value is a measure of a concentration of overlapping words.

15. The electronic device of claim 14, wherein the list of intents and the list of training utterances are automatically generated, and wherein the list of intents is based on a selection of a predetermined number of words from the one or more words satisfying an overlap value threshold and a steepness value threshold.

16. The electronic device of claim 14, wherein each training utterance of the list of training utterances comprises at least one intent from the list of intents.

17. The electronic device of claim 13, wherein selecting, by the NLU model, the domain comprises:
generating, by the NLU model, a domain classification score for each of the one or more domains based on the utterance; and
selecting a domain from the one or more domains corresponding to a highest domain classification score.

18. The electronic device of claim 13, wherein the threading comprises ensuring that each training utterance associated with an intent includes specific words that define the intent.

19. A non-transitory computer-readable medium storing instructions that, when executed by a processor, causes the processor to perform operations comprising:
providing an utterance to a natural language understanding (NLU) model, wherein the NLU model is trained by:
obtaining a dataset comprising utterances;
generating a list of intents by analyzing overlap and steepness values of word combinations in the dataset to identify core actions or topics to act as intents;
grouping the list of intents into one or more domains;
nesting intents sharing a common topic into a domain representing the common topic;
stacking intents similar in meaning within the domain into a unified intent;
generating a list of training utterances for each intent in the list of intents by threading words representing the intent through each training utterance corresponding to that intent; and modifying one or more parameters of the NLU model based on at least one of the list of intents, the list of training utterances, or the one or more domains;

selecting, by the NLU model, an intent by first selecting a domain and then selecting an intent from the list of intents based on the utterance; and providing a response to the utterance based on the selected intent.

20. The non-transitory computer-readable medium of claim 19, wherein the threading comprises ensuring that each training utterance associated with an intent includes specific words that define the intent.

* * * * *